J. J. FISHER.
TROLLEY WIRE SPLICE.
APPLICATION FILED MAR. 9, 1921.
1,386,326.
Patented Aug. 2, 1921.
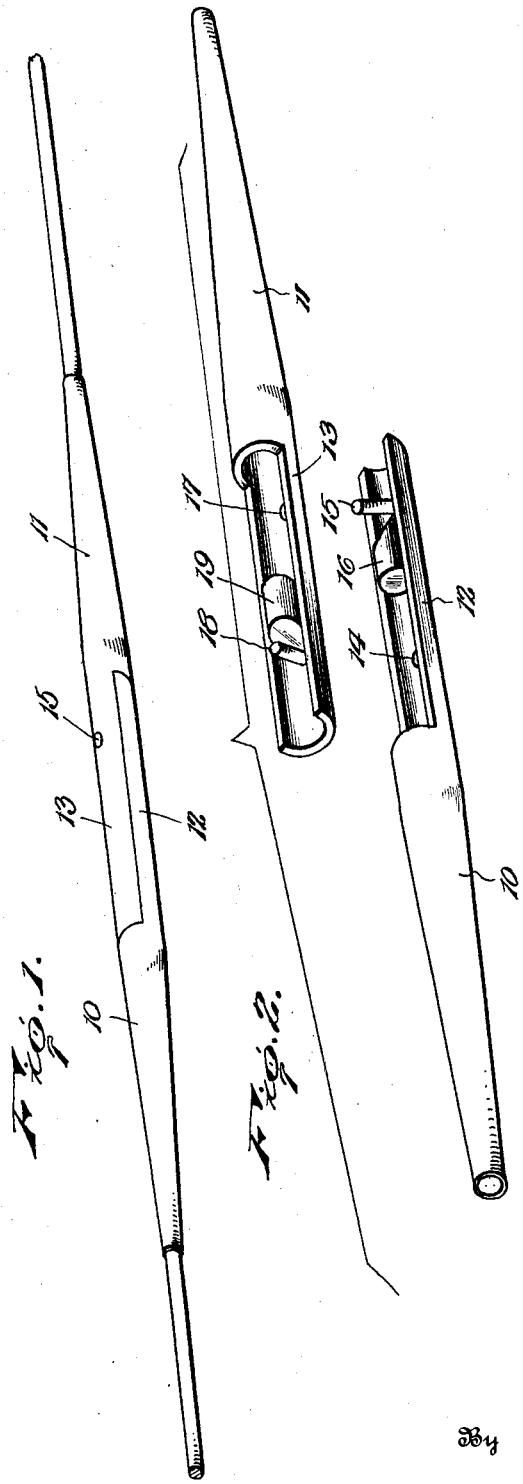
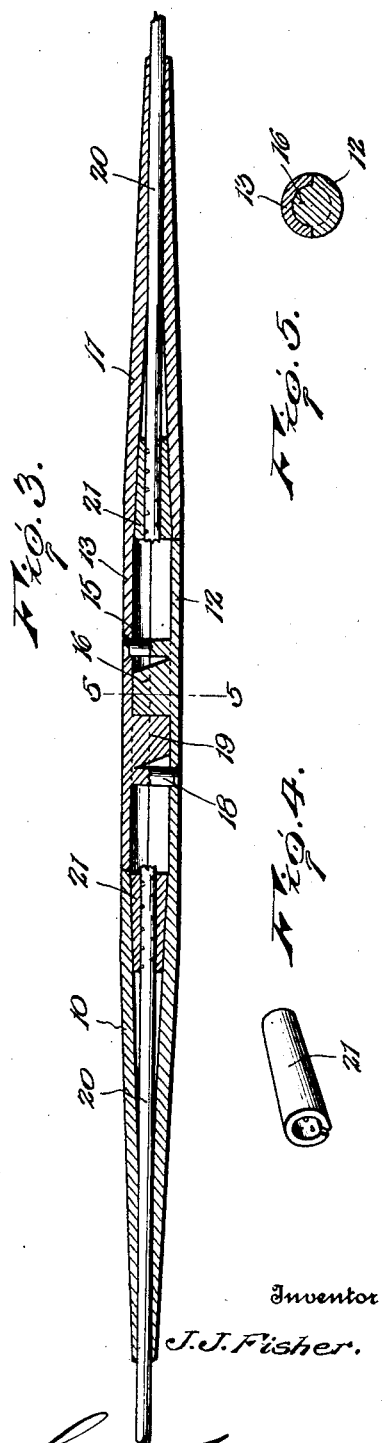
Inventor
J. J. Fisher.

UNITED STATES PATENT OFFICE.

JAMES J. FISHER, OF JUNIOR, WEST VIRGINIA.

TROLLEY-WIRE SPLICE.

1,386,326.　　　　　Specification of Letters Patent.　　Patented Aug. 2, 1921.

Application filed March 9, 1921. Serial No. 451,031.

*To all whom it may concern:*

Be it known that I, JAMES J. FISHER, a citizen of the United States, residing at Junior, in the county of Barbour and State of West Virginia, have invented certain new and useful Improvements in Trolley-Wire Splices, of which the following is a specification.

This invention relates to an improved trolley wire splice and has as one of its principal objects to provide a device of this character particularly adapted for use in mines.

The invention has as a further object to provide a device which may be readily applied and which will form a secure connection between meeting ends of a trolley wire.

And the invention has as a still further object to provide a splice which will form a smooth and uninterrupted joint.

Other and incidental objects will appear hereinafter.

In the drawing:

Figure 1 is a perspective view of my improved splice,

Fig. 2 is a perspective view showing the sections of the splice in detail,

Fig. 3 is a longitudinal sectional view taken medially through the splice,

Fig. 4 is a perspective view showing one of the thimbles employed, and

Fig. 5 is a transverse section on the line 5—5 of Fig. 3.

In carrying the invention into effect, I employ a cylindrical splicing sleeve tapered toward opposite ends thereof. This sleeve may be formed of brass or other approved material and, as clearly illustrated in the drawing, is formed of companion sections 10 and 11, the sections being split medially to provide mating overlapping semi-cylindrical members 12 and 13 respectively. The member 12 is provided near its inner end with an opening 14 and rising from said member near its outer end is a radial stud 15. Formed within the member near the stud is a cylindrical stop lug or shoulder 16. Similarly, the member 13 is provided near its inner end with an opening 17 and rising from the member near its outer end is a radially disposed stud 18. Near this stud the member is formed with a cylindrical stop lug or shoulder 19. As will be observed, the lugs 16 and 19 are provided with flat inner end faces.

In the drawing, I have shown my improved splice in connection with a trolley wire 20. As best shown in Fig. 3, the end portions of the wire are arranged to extend through the sections 10 and 11 of the sleeve and secured to the terminals of the wire are split tapered thimbles 21 fitting within the inner ends of the sections and securely connecting the end portions of the wire therewith. In applying the splice, the end portions of the wire are first inserted through the sections 10 and 11 of the sleeve when one of the thimbles 21 is then applied to each of the terminals of the wire and preferably, said thimbles are provided at their inner sides with spurs adapted to sink into the wire. Consequently, when the thimbles are moved to engage within the inner ends of said sections and the wires placed under stress, the tapered walls of the sections will coact with the thimbles for clamping the thimbles in engagement with the wire, the clamping or wedging action upon the thimbles being, of course, increased as the stress upon the wire is increased. The exterior surfaces of the thimbles are smooth so as to ride over the faces of the walls of the sections at their inner end portions and, preferably, the thimbles are tapered to conform to the taper of said sections. After connecting the end portions of the wire with the sections of the sleeve, as just described, the members 12 and 13 of said sections are then fitted together. As will be observed, the lugs 16 and 19 are disposed to abut for sustaining longitudinal stress upon the splice, the inner end faces of said lugs seating flat against each other while the studs 15 and 18 are disposed to extend through the openings 14 and 17. Accordingly, by upsetting the ends of these studs, as shown in Fig. 3, the sections of the sleeve will be secured against separation. As will be perceived, the splice may be readily applied and will provide a smooth continuous joint between the end portions of the trolley wire.

Having thus described the invention, what is claimed as new is:

1. A splice of the character described including a splice sleeve formed of companion sections, and coacting means upon the sections abutting for rigidly coupling the sections against endwise pull.

2. A splice of the character described including a splice sleeve tapered toward opposite ends thereof and formed of companion sections, and means carried by the sections respectively housed within the sleeve rigidly coupling the sections against endwise pull.

3. A splice of the character described including a splice sleeve formed of companion sections having overlapping members, and means carried by said members respectively housed within the sleeve rigidly coupling the sections against endwise pull.

4. A splice of the character described including a splice sleeve formed of companion sections having coacting means abutting for rigidly sustaining endwise pull upon the sections, and means securing the sections against separation.

5. A splice of the character described including a splice sleeve formed of companion sections provided with coacting shoulders abutting for sustaining endwise pull upon the sections, the shoulders being housed within the sleeve, and means securing the sections against separation.

6. A splice of the character described including a splice sleeve formed of coacting tapered sections, and thimbles fitting in the inner end portions of said sections and adapted for connection with the end portions of a wire whereby lineal stress upon the wire will operate to advance the thimbles within said sections and clamp said thimbles in engagement with the wire.

7. A splice of the character described including a tubular splicing sleeve formed of companion sections having mating semi-cylindrical portions, and coacting transversely disposed shoulders carried by said portions of the sections and abutting for rigidly sustaining endwise pull upon the sleeve in opposite directions.

In testimony whereof I affix my signature.

JAMES J. FISHER. [L. S.]